United States Patent
Chang et al.

(10) Patent No.: US 11,908,447 B2
(45) Date of Patent: Feb. 20, 2024

(54) METHOD AND APPARATUS FOR SYNTHESIZING MULTI-SPEAKER SPEECH USING ARTIFICIAL NEURAL NETWORK

(71) Applicant: IUCF-HYU (Industry-University Cooperation Foundation Hanyang University), Seoul (KR)

(72) Inventors: Joon Hyuk Chang, Seoul (KR); Jae Uk Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 120 days.

(21) Appl. No.: 17/596,037

(22) PCT Filed: Aug. 4, 2021

(86) PCT No.: PCT/KR2021/010307
§ 371 (c)(1),
(2) Date: Dec. 2, 2021

(87) PCT Pub. No.: WO2022/031060
PCT Pub. Date: Feb. 10, 2022

(65) Prior Publication Data
US 2023/0178066 A1 Jun. 8, 2023

(30) Foreign Application Priority Data
Aug. 4, 2020 (KR) .................. 10-2020-0097585

(51) Int. Cl.
*G10L 13/047* (2013.01)
*G10L 17/04* (2013.01)
(Continued)

(52) U.S. Cl.
CPC ............ *G10L 13/047* (2013.01); *G10L 17/04* (2013.01); *G10L 17/06* (2013.01); *G10L 17/18* (2013.01); *G10L 25/18* (2013.01); *G10L 25/30* (2013.01)

(58) Field of Classification Search
None
See application file for complete search history.

(56) References Cited

U.S. PATENT DOCUMENTS 9,922,641 B1 * 3/2018 Chun ................. G10L 15/07
11,200,884 B1 * 12/2021 Srinivasan ............ G10L 17/04
(Continued)

FOREIGN PATENT DOCUMENTS

KR 10-2018-0113325 A 10/2018
KR 10-2019-0008137 A 1/2019
(Continued)

OTHER PUBLICATIONS

Reynolds et al. "Robust Text-Independent Speaker Identification Using Gaussian Mixture Speaker Models", IEEE, 1995 (Year: 1995).*
(Continued)

*Primary Examiner* — Pierre Louis Desir
*Assistant Examiner* — Nicole A K Schmieder
(74) *Attorney, Agent, or Firm* — Sughrue Mion, PLLC

(57) ABSTRACT

According to an aspect, method for synthesizing multi-speaker speech using an artificial neural network comprises generating and storing a speech learning model for a plurality of users by subjecting a synthetic artificial neural network of a speech synthesis model to learning, based on speech data of the plurality of users, generating speaker vectors for a new user who has not been learned and the plurality of users who have already been learned by using a speaker recognition model, determining a speaker vector
(Continued)

having the most similar relationship with the speaker vector of the new user according to preset criteria out of the speaker vectors of the plurality of users who have already been learned, and generating and learning a speaker embedding of the new user by subjecting the synthetic artificial neural network of the speech synthesis model to learning, by using a value of a speaker embedding of a user for the determined speaker vector as an initial value and based on speaker data of the new user.

9 Claims, 6 Drawing Sheets

(51) Int. Cl.
*G10L 17/06* (2013.01)
*G10L 17/18* (2013.01)
*G10L 25/18* (2013.01)
*G10L 25/30* (2013.01)

(56) References Cited

U.S. PATENT DOCUMENTS

2015/0294670 A1* 10/2015 Roblek ................ G10L 17/18
704/232
2019/0019500 A1* 1/2019 Jang ..................... G10L 15/063

FOREIGN PATENT DOCUMENTS

KR 10-2019-0085882 A 7/2019
KR 10-2019-0127233 A 11/2019

OTHER PUBLICATIONS

Sheng et al. "High-Quality Speech Synthesis Using Super-Resolution Mel-Spectrogram," arXivpreprintarXiv:1912.01167, 2019 (Year: 2019).*

Ye Jia, et al., Transfer Learning from Speaker Verification to Multispeaker Text-To-Speech Synthesis, 32nd Conference on Neural Information Processing Systems, 2018, pp. 1-15, Montréal, Canada.

* cited by examiner

[Fig 1]
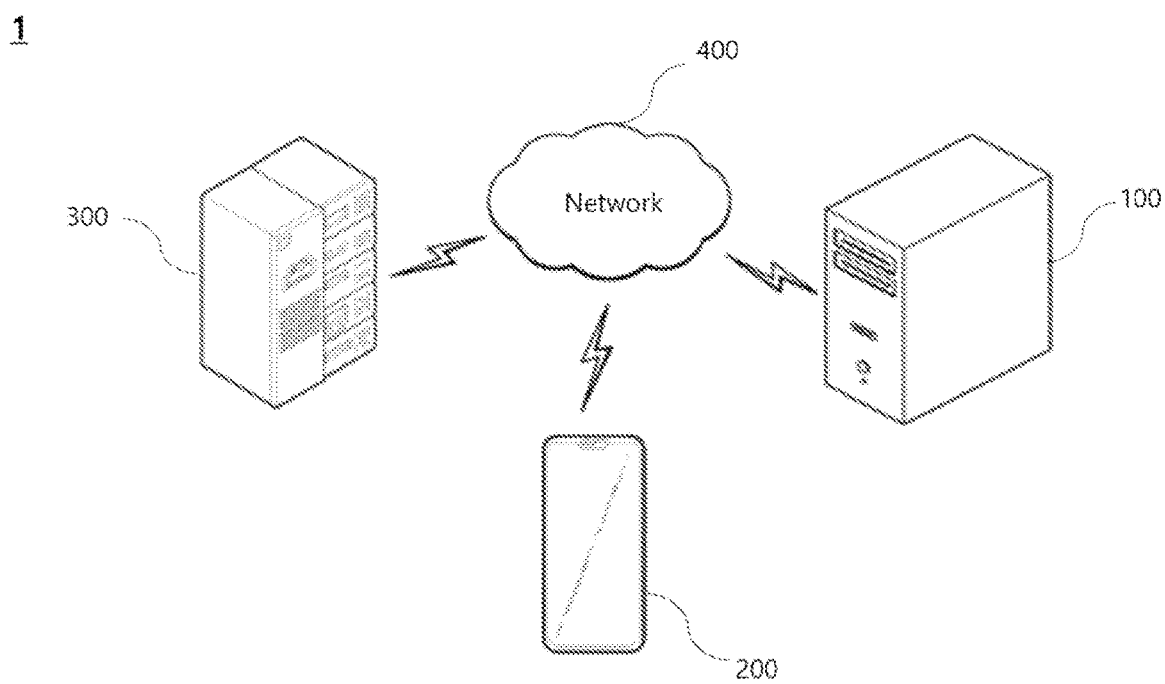

[Fig 2]
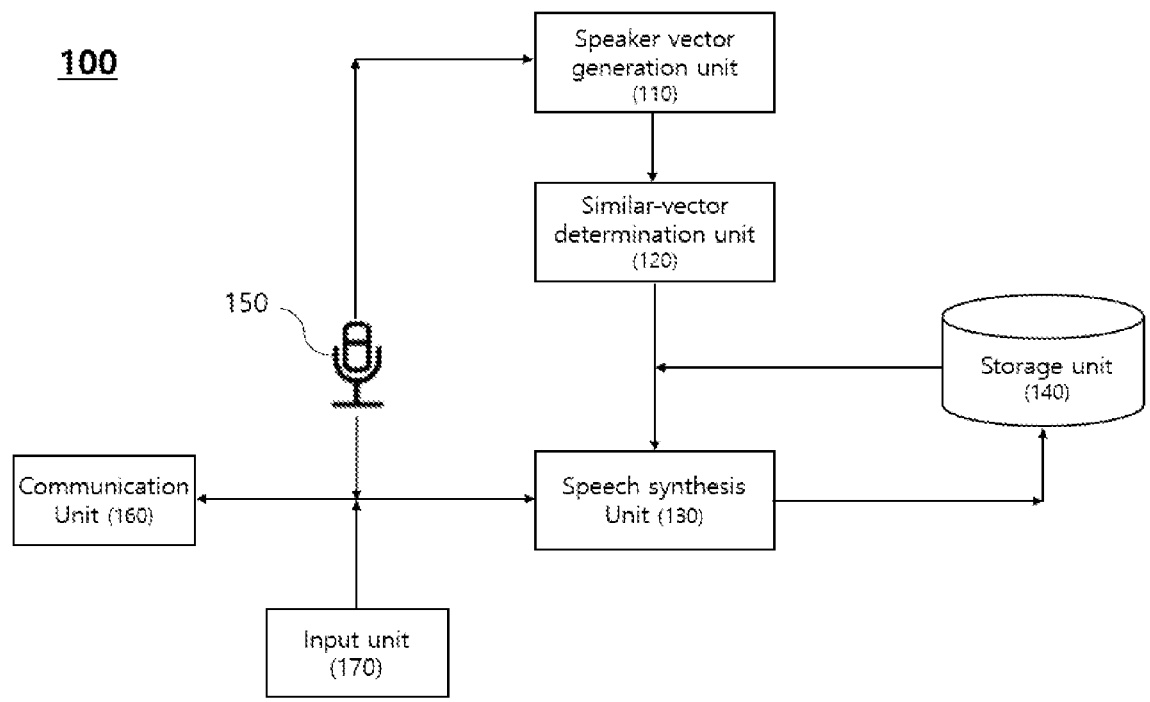

[Fig 3]
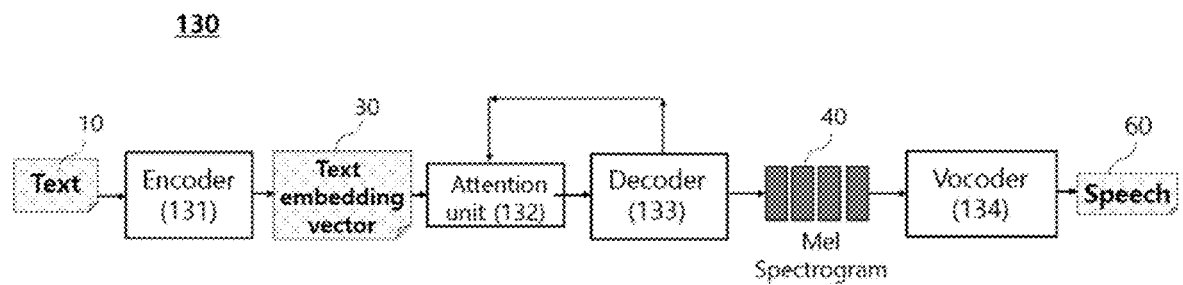

[Fig 4]
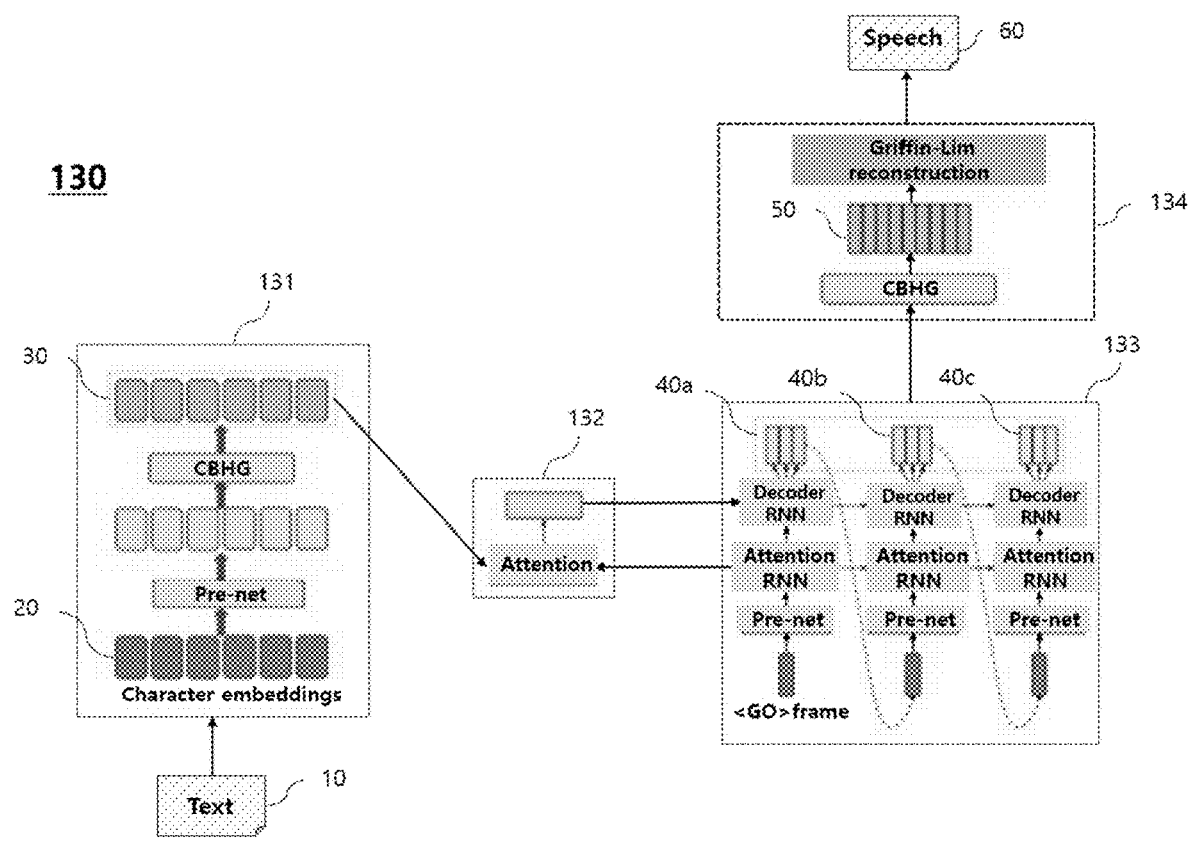

[Fig 5]
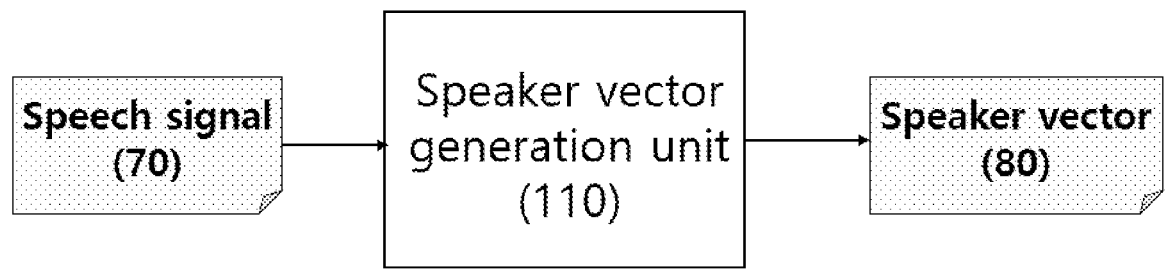

[Fig 6]
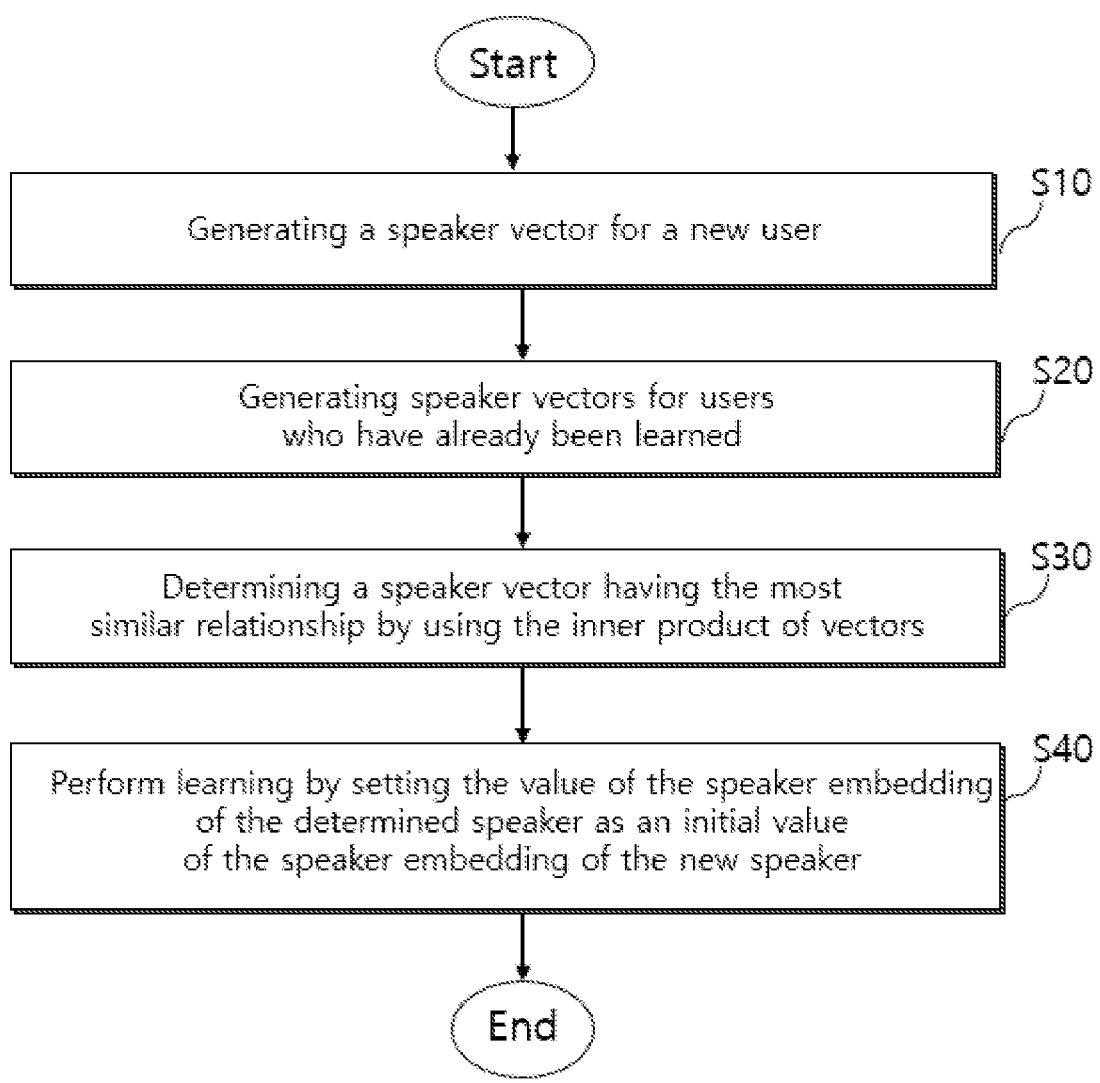

METHOD AND APPARATUS FOR SYNTHESIZING MULTI-SPEAKER SPEECH USING ARTIFICIAL NEURAL NETWORK

CROSS-REFERENCE TO RELATED APPLICATION

This application claims the benefit of Korean Patent Application No. 10-2020-0097585, filed on Aug. 4, 2020 in the Korean Intellectual Property Office, the disclosure of which is incorporated herein by reference.

TECHNICAL FIELD

The present invention relates to a method and apparatus for synthesizing multi-speaker speech using an artificial neural network, and more specifically, to a technique for quickly and accurately generating a speech learning model of a new speaker by using a speech synthesis model of users who have already been learned.

BACKGROUND

Speech is the most natural means of communication for human beings, as well as a means of transmitting information, and a meaningful sound made by human beings as a means of realizing language.

As technology advances, research continues on the realization of communication through speech between humans and machines. Moreover, as the field of speech information technology (SIT) for effectively processing speech information has recently made remarkable progress, it is also applied in real life.

Such speech information technology is broadly classified into categories such as speech recognition, speech synthesis, speaker identification and verification, speech coding, etc.

Speech recognition is a technology that recognizes uttered speech and converts it into a character string, speech synthesis is a technology that converts character strings into original speech by using data or parameters obtained from speech analysis, speaker identification and verification is a technology for estimating or authenticating the speaker through the uttered speech, and speech coding is a technique for effectively compressing and encoding a speech signal.

Out of these, when looked into the development process of speech synthesis technology, computer-based speech synthesis methods have become the mainstream of the speech synthesis technique these days supported by the rapid development of computers, and the speech synthesis technology can be broadly divided into two types according to actual application methods. There are a limited lexical synthesis or Automatic Response System (ARS) that synthesizes only sentences with a limited number of words and a syntactic structure, and an unlimited lexical synthesis or text-to-speech (TTS) system that receives any sentence as input and synthesizes speech.

Of these, the text-to-speech (TTS) system is a technology that generates speech for an arbitrary sentence using a small synthesis unit speech and language processing. Language processing is used to match an input sentence with a combination of appropriate synthesis units, and the prosody of a synthesized speech is determined by extracting appropriate intonation and duration from the sentence. Since speech is synthesized by combinations of phonemes, syllables, etc., which are the basic units of language, there are no limitations on the vocabulary to be synthesized, and it is mainly applied to TTS (text-to-speech) devices, CTS (context-to-speech) devices, etc.

The speech synthesis technology is a technology for generating speech data from sentence data, and generally follows the following three steps.

In the first step, sentence data analysis step, rule-based technology is used to analyze phoneme data and duration data for each phoneme from sentence data.

The second step is a step for determining to which speech data the input phoneme data is closest by using a pre-learned acoustic model based on the phoneme data, and from this, for synthesizing a speech feature vector. In this case, a probabilistic model for each phoneme used is called an acoustic model.

The third step is a step for synthesizing actual speech based on the speech feature vector, and the model that performs this task is called a vocoder.

The quality of synthesized speech generated according to the speech synthesis technology can be evaluated in two criteria of naturalness and sound quality. Here, the naturalness of the two criteria is greatly affected by the first step out of the three steps. The sound quality is greatly influenced by the performance of an acoustic model and a vocoder. Since an acoustic model greatly influences the sound quality, many new algorithms have been presented.

In particular, with the development of artificial intelligence technology, artificial neural network-based algorithms have shown significant performance improvement over existing models. In general, a speech synthesis model using an artificial neural network replaces the part of an acoustic model with an artificial neural network, and thus, the artificial neural network can synthesize speech parameters based on the analyzed sentence data. When everything is learned through deep learning without human intervention in the process of converting text to speech, it is called End-to-End (E2E). Many E2E speech synthesis models (hereinafter, referred to as speech synthesis models) that generate speech from text through End-to-End learning have been proposed.

A multi-speaker speech synthesis model, which is one of the speech synthesis models, refers to a speech synthesis model capable of generating the voices of a plurality of people from one model.

A multi-speaker speech synthesis model can be implemented by changing the acoustic model. First, an acoustic model for each speaker is constructed using speech data for each speaker, and speech is synthesized for each speaker by changing the acoustic model. Since the acoustic model synthesizes speech feature vectors, it is possible to synthesize the speech feature vector for each speaker that reflects each speech characteristic through the replacement of the acoustic model.

However, the conventional multi-speaker speech synthesis model has the advantage of being able to generate speech with the voices of a plurality of speakers, but also has the disadvantage of requiring a lot of data to learn multiple speakers. If it is intended to subject the multi-speaker speech synthesis model to learning with the voices of desired speakers, tens of minutes of speech data and text of its speech are required for each speaker. Collecting such a large amount of data causes a lot of problems in time and money, and in particular, there were many difficulties in various environments when it was implemented by individuals or small businesses.

SUMMARY OF INVENTION

Technical Objects

Therefore, a method and system for synthesizing multi-speaker speech using an artificial neural network in accordance with an embodiment is an invention devised to solve the problems described above, and has an object of promoting efficiency in synthesizing the speech of a plurality of users by enabling learning to be performed with only relatively little speaker data when learning and generating a speech learning model for a new speaker.

Specifically, the present invention can synthesize the speech of a new user with only relatively little data by learning about the voice of the new user, based on a speech learning model of a user that has the most similar characteristics to the voice of the new user and at the same time has already been learned.

According to an aspect, method for synthesizing multi-speaker speech using an artificial neural network comprises generating and storing a speech learning model for a plurality of users by subjecting a synthetic artificial neural network of a speech synthesis model to learning, based on speech data of the plurality of users, generating speaker vectors for a new user who has not been learned and the plurality of users who have already been learned by using a speaker recognition model, determining a speaker vector having the most similar relationship with the speaker vector of the new user according to preset criteria out of the speaker vectors of the plurality of users who have already been learned, and generating and learning a speaker embedding of the new user by subjecting the synthetic artificial neural network of the speech synthesis model to learning, by using a value of a speaker embedding of a user for the determined speaker vector as an initial value and based on speaker data of the new user.

The determining a speaker vector having the most similar relationship according to preset criteria may comprise determining based on values calculated by taking inner products of the speaker vector of the new user and the speaker vectors of the plurality of users who have already been learned.

The determining a speaker vector having the most similar relationship according to preset criteria may comprise calculating cosine similarity values based on the values of the inner products calculated, and determining a speaker vector of a user having the highest cosine similarity value as the speaker vector having the most similar relationship with the speaker vector of the new user.

The generating a speech learning model for the new user may comprise performing the learning of the synthetic artificial neural network of the speech synthesis model only for a preset time in order to prevent overfitting.

The preset time may comprise a range of 10 seconds to 60 seconds.

The generating speaker vectors may comprise generating the speaker vectors using an artificial neural network of the speaker recognition model, by using a speech signal of the user as an input value.

The method for synthesizing multi-speaker speech using an artificial neural network may further comprise converting a mel-scale spectrogram calculated through the synthetic artificial neural network of the speech synthesis model into speech through a Griffin-Lim algorithm.

The synthetic artificial neural network model of the speech synthesis model may comprise a Tacotron 2 algorithm.

According to another aspect, an apparatus for synthesizing multi-speaker speech using an artificial neural network may comprise a speech synthesis unit configured to generate a speech learning model for a plurality of users by subjecting a synthetic artificial neural network of a speech synthesis model to learning, based on speech data of the plurality of users, a storage unit configured to store information on the speech learning model generated, a speaker vector generation unit configured to generate speaker vectors for a new user who has not been learned and the plurality of users who have already been learned by using a speaker recognition model; and a similar-vector determination unit configured to determine a speaker vector having the most similar relationship with the speaker vector of the new user according to preset criteria out of the speaker vectors of the plurality of users who have already been learned and the speech synthesis unit may generate and learn a speaker embedding of the new user by subjecting the synthetic artificial neural network of the speech synthesis model to learning, by using a value of a speaker embedding of a user for the determined speaker vector as an initial value and based on speaker data of the new user.

The similar-vector determination unit may determine the speaker vector having the most similar relationship with the speaker vector of the new user based on values calculated by taking inner products of the speaker vector of the new user and the speaker vectors of the plurality of users who have already been learned.

The similar-vector determination unit may calculate cosine similarity values based on the values of the inner products calculated, and then determines a speaker vector of a user having the highest cosine similarity value as the speaker vector having the most similar relationship with the speaker vector of the new user.

The speech synthesis unit may perform the learning of the synthetic artificial neural network of the speech model only for a preset time in order to prevent overfitting.

The preset time may comprise a range of 10 seconds to 60 seconds.

The speaker vector generation unit generates the speaker vectors using an artificial neural network of the speaker recognition model, by using a speech signal of the user as an input value.

According to the other aspect, an apparatus for synthesizing multi-speaker speech using an artificial neural network may comprise a communication unit configured to receive, from an external server, information on a speech learning model for a plurality of users by subjecting a synthetic artificial neural network of a speech synthesis model to learning, based on speech data of the plurality of users, a storage unit configured to store information on the speech learning model generated, a speaker vector generation unit configured to generate speaker vectors for a new user who has not been learned and the plurality of users who have already been learned by using a speaker recognition model and a similar-vector determination unit configured to determine a speaker vector having the most similar relationship with the speaker vector of the new user according to preset criteria out of the speaker vectors of the plurality of users who have already been learned and the speech synthesis unit may generate and learn a speaker embedding of the new user by subjecting the synthetic artificial neural network of the speech synthesis model to learning, by using a value of a speaker embedding of a user for the determined speaker vector as an initial value and based on speaker data of the new user.

BRIEF DESCRIPTION OF THE DRAWINGS

FIG. 1 is a block diagram illustrating some components of a multi-speaker speech synthesis system using an artificial neural network in accordance with one embodiment.

FIG. 2 is a block diagram illustrating some components of a multi-speaker speech synthesis apparatus using an artificial neural network in accordance with one embodiment.

FIG. 3 is a diagram for illustrating a speech learning model in accordance with one embodiment.

FIG. 4 is a diagram for illustrating a Tacotron 2 algorithm applied to the speech learning model, according to one embodiment.

FIG. 5 is a diagram for illustrating a speaker vector generation unit in accordance with one embodiment.

FIG. 6 is a flowchart illustrating an operation procedure of an apparatus for synthesizing multi-speaker speech using an artificial neural network in accordance with one embodiment.

EFFECTS OF THE INVENTION

Since the method and apparatus for synthesizing speech using an artificial neural network in accordance with an embodiment performs learning on the voice of a new user, based on a speech learning model of a user that has the most similar characteristics to the voice of the new user and has already been learned, there is an advantage of enabling the synthesis of the speech of the new user with only relatively little data, unlike the prior art.

In addition, since the method and apparatus for synthesizing speech using an artificial neural network in accordance with an embodiment performs learning by setting the initial value of the speaker embedding of the new speaker as the speaker embedding of the speaker with the most similar voice in performing learning using the artificial neural network, there is an effect of being able to prevent overfitting while performing learning with a small amount of learning data.

DETAILED DESCRIPTION OF EMBODIMENTS

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise.

It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms.

Hereinafter, embodiments of the present disclosure will be described in detail with reference to the accompanying drawings so that the present disclosure may be readily implemented by those skilled in the art. In the drawings, parts irrelevant to the description are omitted for the simplicity of explanation.

FIG. 1 is a block diagram illustrating some components of a multi-speaker speech synthesis system 1 using an artificial neural network in accordance with one embodiment.

As shown in FIG. 1, in the multi-speaker speech synthesis system 1 using an artificial neural network, a multi-speaker speech synthesis apparatus 100, a user terminal 200, and a server 300 may be in communication connection with each other through a network 400. The multi-speaker speech synthesis apparatus 100 using an artificial neural network, the user terminal 200, and the server 300 may be connected to each other in a 5G communication environment.

Also, in addition to the devices shown in FIG. 1, various electronic devices used at home or in offices may be connected to each other and operate in an Internet of Things environment. The multi-speaker speech synthesis apparatus 100 using an artificial neural network will be described by being referred to as a speech synthesis apparatus 100 for the convenience of description in the following.

The speech synthesis apparatus 100 is a device for generating a voice of a particular user from a target text inputted and outputting it, and is not only a device for outputting speech but also is provided with devices necessary to perform various artificial intelligence algorithms, and may have stored thereon data necessary for operating the artificial neural network.

The speech synthesis apparatus 100 is a device capable of outputting the speech of a user learned, inferred, and synthesized by an artificial neural network module, and may be implemented as a device such as a server, a PC, a tablet PC, a smartphone, a smartwatch, smart glasses, a wearable device, etc., and may also be implemented as a particular application or program.

The user terminal 200 may monitor the status information of the speech synthesis apparatus 100 through an authentication process after accessing a speech synthesis application or a speech synthesis site, or may be provided with a service capable of driving or controlling the multi-speaker speech synthesis apparatus 100.

In this embodiment, the user terminal 200 that has completed the authentication process may select, as an example, a text for synthesizing speech and a speech learning model for generating speech, and may receive a speech result outputted by the speech synthesis apparatus 100 by the target text and the speech learning model selected.

In this embodiment, the user terminal 200 may be a desktop computer, a smartphone, a laptop, a tablet PC, a smart TV, a mobile phone, a personal digital assistant (PDA), a laptop, a media player, a micro-server, a global positioning system (GPS) device, an e-book terminal, a digital broadcasting terminal, a navigation device, a kiosk, an MP3 player, a digital camera, a home appliance, and other mobile or non-mobile computing device operated by the user, but is not limited thereto. In addition, the user terminal 200 may be a wearable terminal such as a watch, glasses, a hairband, and a ring having a communication function and a data processing function. The user terminal 200 is not limited to what is described above, and any terminal capable of web browsing may be adopted without limitation.

The server 300 may be a database server that provides big data necessary for applying various artificial intelligence algorithms and data for operating the speech synthesis apparatus 100. Besides, the server 300 may include a web server or application server that allows remote control of the operation of the speech synthesis apparatus 100 by using a speech synthesis application or a speech synthesis web browser installed in the user terminal 200.

Here, artificial intelligence (AI) is one area of computer engineering and information technology that conducts research on the ways to enable computers to do the thinking, learning, self-development, etc. that can be done with human intelligence, and may mean allowing computers to mimic intelligent human behavior.

Also, artificial intelligence is deeply involved directly or indirectly with other areas of computer science, rather than existing on its own. In particular, in modern times, multiple areas of information technology have adopted elements of artificial intelligence and actively attempted to utilize them in solving problems in those areas.

Machine learning is one area of artificial intelligence, and may include research areas that give computers the ability to learn without explicit programming.

Specifically, machine learning can be said to be a technology for researching and constructing systems that learn based on empirical data, make predictions, and improve their own performance, and algorithms therefor. Algorithms in machine learning may take the approach of constructing particular models to derive predictions or decisions based on input data, rather than executing strictly defined static program instructions.

Further, the server 300 may transmit and receive signals to and from the artificial speech synthesis apparatus 100 and/or the user terminal 200.

The server 300 may receive information about the text to be converted into speech received from the user terminal 200 and about the speech synthesis model selected, and then may transmit the received information to the speech synthesis apparatus 100.

The server 300 may generate speech using an artificial neural network based on the text and speech synthesis model selected by the user terminal 200, and may transmit information about the generated speech to the speech synthesis apparatus 100.

Alternatively, the server 300 may selectively transmit only necessary data to the speech synthesis apparatus 100 so that the multi-speaker speech synthesis apparatus 100 can synthesize speech. That is, the speech synthesis of the user and the artificial intelligence processor may be performed by the server 300, or may be performed by the speech synthesis apparatus 100.

The network 400 may serve to connect the multi-speaker speech synthesis apparatus 100 using an artificial neural network, the user terminal 200, and the server 300. Such a network 400 may encompass wired networks such as, for example, LANs (local area networks), WANs (wide area networks), MANs (metropolitan area networks), ISDNs (integrated service digital networks), and wireless networks such as wireless LANs, CDMA, Bluetooth, and satellite communications, but the scope of the present invention is not limited thereto. In addition, the network 400 may transmit and receive information using short-range communication and/or telecommunication. Here, the short-range communication may include Bluetooth, radio frequency identification (RFID), infrared data association (IrDA), ultra-wideband (UWB), ZigBee, and wireless fidelity (Wi-Fi) technologies, and telecommunication may include code division multiple access (CDMA), frequency division multiple access (FDMA), time division multiple access (TDMA), orthogonal frequency division multiple access (OFDMA), single carrier frequency division multiple access (SC-FDMA) technologies.

The network 400 may include connections of network elements such as hubs, bridges, routers, switches, and gateways. The network 400 may include one or more connected networks including public networks such as the Internet and private networks such as secure enterprise private networks, for example, multi-network environments. Access to the network 400 may be provided via one or more wired or wireless access networks. Furthermore, the network 400 may support IoT (Internet of Things) networks, which exchange and process information between distributed components such as things, and/or 5G communications.

FIG. 2 is a block diagram illustrating some components of a multi-speaker speech synthesis apparatus using an artificial neural network in accordance with one embodiment, and FIG. 3 is a diagram for illustrating a speech learning model in accordance with one embodiment. FIG. 4 is a diagram for illustrating a Tacotron 2 algorithm applied to the speech learning model, according to one embodiment, and FIG. 5 is a diagram for illustrating a speaker vector generation unit in accordance with one embodiment.

Referring to FIGS. 2 to 5, the speech synthesis apparatus 100 may include a speaker vector generation unit 110, a similar-vector determination unit 120, a speech synthesis unit 130, a storage unit 140, a microphone 150, a communication unit 160, an input unit 170, and so on.

The communication unit 160 may receive various commands for speech synthesis while performing communication with the user terminal 200 and the server 300, and may receive various pieces of information necessary for synthesizing speech from the server 300.

Therefore, the communication unit 160 may perform wireless communication according to a method, such as LTE (long-term evolution), LTE-A (LTE Advance), CDMA (code division multiple access), WCDMA (wideband CDMA), WiBro (Wireless Broadband), Wi-Fi (wireless fidelity), Bluetooth, NFC (near field communication), Global Positioning System (GPS) or global navigation satellite system (GNSS). For example, the communication unit 110 may perform wired communication according to a method, such as USB (universal serial bus), HDMI (high-definition multimedia interface), RS-232 (recommended standard 232), or POTS (plain old telephone service).

The speech synthesis unit 130 may synthesize the text inputted from the input unit 170 into speech. Specifically, when a text is inputted, the speech synthesis unit 130 may convert the text into a natural synthesized speech through a process of linguistically interpreting the text inputted and synthesizing it into speech, and output it, and this process may be done via TTS (text-to-speech).

Therefore, the speech synthesis unit 130 converts the text to be verified into a pre-processed speech through three steps of language processing, prosody generation, and waveform synthesis. It is possible to analyze the grammatical structure of the text to be verified (language processing step), to generate prosody in the way humans read by the grammatical structure analyzed, and to generate a synthesized speech by collecting basic units according to the generated prosody.

Referring to FIGS. 3 and 4, the speech synthesis unit 130 in one embodiment may convert the text into a speech spectrogram using a Tacotron 2 algorithm, and may output speech 60 by converting the speech spectrogram.

The Tacotron algorithm is a 'sequence-to-sequence' model that utilizes a recurrent neural network (RNN) encoder-decoder, and may include an encoder 131 for extracting necessary information from the text 10, a decoder 133 for synthesizing speech from a text feature vector outputted from the encoder 131, and a vocoder 134 for converting a Mel Spectrogram outputted from the decoder 133 into speech, as shown in FIG. 3.

The encoder 131 may decompose the inputted text 10 into character units and output a character embedding 20 in the form of a vector, and the outputted character embedding 20 may be outputted as a text embedding vector 30 via a neural network.

As the neural network used in the encoder, a CBHG module, that is, a neural network in which a convolutional neural network, a highway network, and a bi-directional recurrent neural network are stacked in order may be used.

In the decoder 133, as an input value to the decoder network at time step t, the weighted sum of the text embedding vectors 30 and the last decoder output value of the previous time step t−1 may be added up and used.

The output value of the decoder 133 may output r vectors for each time step in a mel-scale spectrogram 40. Only the last vector out of the r vectors may be used as the decoder input value in the next time step.

Three mel-scale spectrograms 40a, 40b, and 40c are illustrated in FIG. 4 as an example, but the number of mel-scale spectrograms may be outputted in various numbers according to the text 10 inputted. The mel-scale spectrogram 40 is in the frequency domain, and is obtained by dividing the range of the entire frequency in log-scale.

In the range of audible frequencies (20-20000 Hz), frequencies that make up an actual human speech have the characteristic of being distributed more in a low-frequency range. Therefore, if the frequency range is divided in log-scale, the low frequencies can be divided finely and the frequency characteristics for the human speech can be well represented, and thus, the mel-scale spectrogram 40 is used a lot in the decoder 133.

The mel-scale spectrogram vectors 40a, 40b, and 40c generated in the number of r for each time step are combined in the direction of the decoder time step to form a mel-scale spectrogram of the entire synthesized speech, and this spectrogram may be converted into a linear-scale spectrogram 50 via an additional neural network.

Thereafter, the linear-scale spectrogram 50 is converted into a wave form through the 'Griffin-Lim reconstruction' algorithm, and if this is written as a '~.wav' file, a speech file 60 can be generated.

An attention unit 132 may serve to determine whether to generate the mel-scale spectrogram 40 by reflecting each letter several times through the text embedding vector 30 outputted from the encoder 131.

If looked into this in detail, when converting text into speech, since the length of the speech corresponding to each text is different each time, the length of the mel-scale spectrogram generated for each letter in the process of converting text into speech is different. Therefore, when generating the mel-scale spectrogram 40 in the decoder 134, it is most efficient to identify to which letter the mel-scale spectrogram 40 outputted corresponds and to reflect more the text embedding vector 30 outputted from the encoder 131 for that letter, thereby generating the mel-scale spectrogram 40, rather than observing the entire text and outputting the mel-scale spectrogram 40 sequentially.

Therefore, the attention unit 132 may serve to determine whether to generate the mel-scale spectrogram 40 by reflecting each letter several times through the text embedding vector 30 outputted from the encoder 131 using an attention algorithm. That is, the attention unit 132 assigns a weight to the text embedding vector 30 and inputs it to the decoder 134. Then, the decoder 134 may generate the mel-scale spectrogram 40 based on the inputted value.

The speech information for a particular user generated by the speech synthesis unit 130 and various information on the speech synthesis model for the particular user learned by the artificial neural network in the speech synthesis unit 130 may be stored in the storage unit 140, and this information may be utilized as basic information when generating a speech learning model for a new speaker.

Accordingly, the storage unit 140 may store various data and may include volatile and/or non-volatile memory.

In general, when subjecting the multi-speaker speech synthesis model to learning through speaker embedding, data for a plurality of speakers is needed, and even with the DeepVoice2 algorithm, which is the most used in multi-speaker speech synthesis models (Sercan Arik, Gregory Diamos, Andrew Gibiansky, John Miller, Kainan Peng, Wei Ping, Jonathan Raiman, Yanqi Zhou, Deep Voice 2: Multi-Speaker Neural Text-to-Speech, NIPS 2017), learning can be performed efficiently only if at least 20 minutes or more of data for each speaker is used.

Such a multi-speaker speech synthesis model has the advantage of being able to generate speech with the voices of a plurality of speakers, but requires a lot of data to learn a plurality of speakers. If it is intended to subject the multi-speaker speech synthesis model to learning with the voices of desired speakers, tens of minutes of speech data and speech text corresponding thereto are required for each speaker. Collecting such a large amount of data causes a lot of problems in time and money, and it is especially difficult for individuals or small businesses to do so.

Therefore, a speech synthesis method and apparatus 100 in accordance with an embodiment is an invention devised to solve such problems, and has an object of promoting efficiency in synthesizing the speech of a plurality of users by enabling learning to be performed with only relatively little speaker data when learning a speech learning model for a new speaker. Details will be discussed in the following.

A typical multi-speaker speech synthesis model (e.g., DeepVoice2) consists of a very large number of neural networks, of which recurrent neural networks take up the majority. That is, a recurrent neural network has a neural network structure in which an output value is used as an input value again, and this is repeated a plurality of times to generate an output value.

This recurrent neural network generates an appropriate output value at each turn through a method in which a hidden state is updated each time this process is repeated a plurality of times. If the initial hidden state of the recurrent neural network is used as speaker embedding, then speech can be synthesized with the voice of a speaker corresponding to that speaker embedding.

When generating speech with the voices of a plurality of speakers, the artificial neural network does not perform different operations for the plurality of speakers. That is, speech is generated with different voices by the numbers that make up the speaker embedding, while performing the same operation. Therefore, it can be concluded that the values of speaker embeddings are similar in order to generate similar voices.

For example, if there is a significant difference in timbre, such as a male speaker and a female speaker, the speaker embeddings of these two will consist of values with a significant difference, and the values of the speaker embeddings of the voices of two speakers with similar characteristics are similar. Therefore, when learning the voice of a new speaker, if the learning starts with the value of the speaker embedding of a speaker who has a similar voice to the new speaker and has already been learned, it is possible to obtain a value of a speaker embedding suitable for the new speaker with only a relatively small number of times. Therefore, if speech is synthesized based on this, there is an advantage that speech for a new speaker can be synthesized quickly with only relatively little data. A method of determining a user who has already been learned and has the most similar characteristics to a new user for whom speech is to be synthesized will be described based again on FIGS. 2 and 5.

Referring to FIGS. 2 and 5, the speaker vector generation unit 110 may generate a speaker vector 80. Specifically, the speaker vector generation unit 110 may receive a speech signal 70 of a user inputted from a microphone 150, and apply it to a speaker recognition algorithm to generate a speaker vector containing information on the characteristics of the voice of that speaker. That is, the speaker vector 80 refers to a vector having a different value for each speaker, and if this is inputted together for each speaker into a single-speaker speech synthesis model, the single-speaker speech synthesis model can learn a plurality of speakers separately.

Specifically, the speaker vector generation unit 110 may convert the inputted speech signal 70 into a mel-scale spectrogram, and then divide it into constant sizes, and input them to the recurrent neural network of the speaker recognition model to generate a speaker vector. After a plurality of speaker vectors has been generated from one speech signal, a value obtained by averaging out the speaker vectors is a final speaker vector 80 for the speech signal inputted.

The speaker recognition algorithm adopted by the speaker vector generation unit 110 may employ various types of algorithms, and the present invention may adopt a speaker recognition model (Li Wan, Quan Wang, Alan Papir, Ignacio Lopez Moreno, Generalized End-to-End Loss for Speaker Verification, ICASSP 2018), which is typically widely used as a speaker recognition algorithm.

The similar-vector determination unit 120 may determine the degree of similarity of speech between users based on the speaker vector 80 generated by the speaker vector generation unit 110. Specifically, since the speaker vector 80 is represented in vector, it can be determined through cosine similarity that can express a close relationship between vectors. The cosine similarity can be expressed by the following equation, using the inner product of vectors and the absolute value of the vectors:

$$\text{Cosine Similarity}(A,B) = \frac{A \cdot B}{\|A\| \, \|B\|}$$

If there are vectors A and B, the similar-vector determination unit 120 may take the inner product of the two vectors using the above equation, and then find the similarity between the two vectors based on the resulting value.

Specifically, the similar-vector determination unit 120 may perform inner products, respectively, on the speaker vector of a user for whom speech is to be synthesized newly and the speaker vectors of the users who have already been learned by using the speaker recognition model mentioned above, and then calculate the cosine similarity value and find the speaker with the highest value. The cosine similarity value will be calculated within the range of [0, 1], meaning that characteristically, the closer it is to 1, the more similar the voices are to each other, and the closer it is to 0, the less similar the voices are to each other. Accordingly, the fact that the cosine similarity value with a particular user has been calculated the highest means that this is the speaker with a speaker embedding most similar to the speaker embedding of the new speaker.

Therefore, once the similar-vector determination unit 120 determines a user who has already been learned while having the characteristics most similar to a user for whom speech is to be synthesized newly, the speech synthesis unit 130 may perform learning for the new user by using the speech learning model of the user determined.

Specifically, since the user determined by the similar-vector determination unit 120 is the speaker who is most similar in voice to the new speaker, the speech synthesis unit 130 may set the value of the speaker embedding of the determined speaker as the initial value of the speaker embedding of the new speaker, and then perform learning. Because the present invention performs learning on the voice of a new user, based on a speech learning model of users who have the most similar characteristics to the voice of the new user and have already been learned, there is an advantage of enabling the synthesis of the speech of the new user with only relatively little data, unlike the prior art.

The learning process of a typical deep learning model proceeds with learning so as to be able to predict a value similar to an actual correct answer. That is, it learns output values according to input values through learning data. Therefore, since better performance will be achieved when learned by taking into account more cases, the learning data will consist of data with various characteristics so that a plurality of variables can be taken into consideration. This is because it can be robust against new data only when it is optimized for a plurality of characteristics. However, if the characteristics of the learning data are not diverse, optimization is made for a small number of characteristics, and this causes a problem of becoming difficult to cope with new data, which is called overfitting. It is common for the speech synthesis model as well to learn with a plurality of sentences reflected with various characteristics in the learning data to prevent such a problem from occurring, and to learn using data of several tens of minutes or several hours.

If the speech synthesis apparatus performs learning with only a small amount of data for a new speaker, the overfitting phenomenon is likely to occur as the number of times of learning increases because of the small amount of data. If the speech synthesis apparatus 100 in accordance with the present invention performs learning without considering the speaker embedding of another speaker, it is likely to cause overfitting problems due to small amounts of data; however, in the case of the present invention, since learning is performed using the initial value of the speaker embedding of a new speaker so as to be able to generate a speaker embedding suitable for the new speaker and using the speaker embedding of the speaker with the most similar voice, there is an advantage that it is possible to generate the speech of the new speaker without causing overfitting even when learning is performed with a small amount of learning data.

That is, in the case of the present invention, since a speech learning model for a new speaker is created with only data of about tens of seconds to a minute, there is an advantage of being able to generate a speech learning model for a new speaker with relatively little data and in a short time.

FIG. 6 is a flowchart illustrating an operation procedure of an apparatus for synthesizing multi-speaker speech using an artificial neural network in accordance with one embodiment.

Referring to FIG. 6, to create a speech synthesis model for a new speaker, the speech synthesis apparatus 100 may generate speaker vectors for a new user who has not been learned and a plurality of pre-learned users by using a speaker recognition model. (S10, S20)

Next, the speech synthesis apparatus 100 may determine a speaker vector having the most similar relationship with the speaker vector for the new user out of the speaker vectors for the plurality of pre-learned users according to preset criteria. (S30)

Specifically, it is possible to determine the user who has the voice most similar to the voice of the new speaker, based on the inner product value of the speaker vector for the new user and the speaker vectors for the plurality of pre-learned users.

Next, the speech synthesis apparatus 100 may synthesize the speech for the new user in the method of creating and learning the speaker embedding of the new user by subjecting a synthetic artificial neural network of the speech synthesis model to learning, by using the value of the speaker embedding of the user for the determined speaker vector as an initial value and based on the speaker data for the new user. (S40)

Since the method and apparatus for synthesizing speech using an artificial neural network in accordance with an embodiment performs learning on the voice of a new user, based on a speech learning model of a user that has the most similar characteristics to the voice of the new user and has already been learned, there is an advantage of enabling the synthesis of the speech of the new user with only relatively little data, unlike the prior art.

In addition, since the method and apparatus for synthesizing speech using an artificial neural network in accordance with an embodiment performs learning by setting the initial value of the speaker embedding of the new speaker as the speaker embedding of the speaker with the most similar voice in performing learning using the artificial neural network, there is an effect of being able to prevent overfitting while performing learning with a small amount of learning data.

On the other hand, the constitutional elements, units, modules, components, and the like stated as "part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. A method for synthesizing multi-speaker speech using an artificial neural network, comprising:
   generating and storing a speech learning model for a plurality of users by subjecting a synthetic artificial neural network of a speech synthesis model to learning, based on speech data of the plurality of users;
   generating speaker vectors for a new user who has not been learned and the plurality of users who have already been learned by using a speaker recognition model;
   determining a speaker vector having a most similar relationship with the speaker vector of the new user according to preset criteria out of the speaker vectors of the plurality of users who have already been learned;
   generating and learning a speaker embedding of the new user by subjecting the synthetic artificial neural network of the speech synthesis model to learning, by using a value of a speaker embedding of a user for the determined speaker vector as an initial value and based on speaker data of the new user;
   wherein the generating a speech learning model for the new user comprises performing the learning of the synthetic artificial neural network of the speech synthesis model only for a preset time that prevents overfitting,
   wherein the preset time comprises a range of 10 seconds to 60 seconds, and
   wherein the generating speaker vectors comprises generating the speaker vectors using an artificial neural network of the speaker recognition model, by using a speech signal of the user as an input value.

2. The method for synthesizing multi-speaker speech using the artificial neural network of claim 1, wherein the determining a speaker vector having the most similar relationship according to preset criteria comprises:
   determining based on values calculated by taking inner products of the speaker vector of the new user and the speaker vectors of the plurality of users who have already been learned.

3. The method for synthesizing multi-speaker speech using the artificial neural network of claim 2, wherein the determining a speaker vector having the most similar relationship according to preset criteria comprises:

calculating cosine similarity values based on the values of the inner products calculated, and determining a speaker vector of a user having a highest cosine similarity value as the speaker vector having the most similar relationship with the speaker vector of the new user.

4. The method for synthesizing multi-speaker speech using the artificial neural network of claim 1, further comprising:
converting a mel-scale spectrogram calculated through the synthetic artificial neural network of the speech synthesis model into speech through a Griffin-Lim algorithm.

5. The method for synthesizing multi-speaker speech using the artificial neural network of claim 1, wherein the synthetic artificial neural network model of the speech synthesis model comprises a Tacotron 2 algorithm.

6. An apparatus for synthesizing multi-speaker speech using an artificial neural network, comprising:
a speech synthesizer configured to generate a speech learning model for a plurality of users by subjecting a synthetic artificial neural network of a speech synthesis model to learning, based on speech data of the plurality of users;
a storage configured to store information on the speech learning model generated;
a speaker vector generator configured to generate speaker vectors for a new user who has not been learned and the plurality of users who have already been learned by using a speaker recognition model; and
a similar-vector determinator configured to determine a speaker vector having a most similar relationship with the speaker vector of the new user according to preset criteria out of the speaker vectors of the plurality of users who have already been learned, wherein the speech synthesizer generates and learns a speaker embedding of the new user by subjecting the synthetic artificial neural network of the speech synthesis model to learning, by using a value of a speaker embedding of a user for the determined speaker vector as an initial value and based on speaker data of the new user,
wherein the speech synthesizer is configured to perform the learning of the synthetic artificial neural network of the speech synthesis model only for a preset time that prevents overfitting,
wherein the preset time comprises a range of 10 seconds to 60 seconds, and
wherein the speaker vector generator is configured to generate the speaker vectors using an artificial neural network of the speaker recognition model, by using a speech signal of the user as an input value.

7. The apparatus for synthesizing multi-speaker speech using the artificial neural network of claim 6, wherein the similar-vector determinator determines the speaker vector having the most similar relationship with the speaker vector of the new user based on values calculated by taking inner products of the speaker vector of the new user and the speaker vectors of the plurality of users who have already been learned.

8. The apparatus for synthesizing multi-speaker speech using the artificial neural network of claim 7, wherein the similar-vector determinator calculates cosine similarity values based on the values of the inner products calculated, and then determines a speaker vector of a user having a highest cosine similarity value as the speaker vector having the most similar relationship with the speaker vector of the new user.

9. An apparatus for synthesizing multi-speaker speech using an artificial neural network, comprising:
a communicator configured to receive, from an external server, information on a speech learning model for a plurality of users by subjecting a synthetic artificial neural network of a speech synthesis model to learning, based on speech data of the plurality of users;
a storage configured to store information on the speech learning model generated;
a speaker vector generator configured to generate speaker vectors for a new user who has not been learned and the plurality of users who have already been learned by using a speaker recognition model; and
a similar-vector determinator configured to determine a speaker vector having a most similar relationship with the speaker vector of the new user according to preset criteria out of the speaker vectors of the plurality of users who have already been learned; and
a speech synthesizer configured to generate and learn a speaker embedding of the new user by subjecting the synthetic artificial neural network of the speech synthesis model to learning, by using a value of a speaker embedding of a user for the determined speaker vector as an initial value and based on speaker data of the new user,
wherein the speech synthesizer is configured to perform the learning of the synthetic artificial neural network of the speech synthesis model only for a preset time that prevents overfitting,
wherein the preset time comprises a range of 10 seconds to 60 seconds, and
wherein the speaker vector generator is configured to generate the speaker vectors using an artificial neural network of the speaker recognition model, by using a speech signal of the user as an input value.

* * * * *